United States Patent
Froling

(10) Patent No.: US 9,043,095 B2
(45) Date of Patent: May 26, 2015

(54) USER PROGRAMMABLE MOTOR VEHICLE DRIVING PARAMETER CONTROL SYSTEM

(71) Applicant: GM Global Technology Operations LLC, Detroit, MI (US)

(72) Inventor: Thomas H. Froling, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 92 days.

(21) Appl. No.: 13/927,642

(22) Filed: Jun. 26, 2013

(65) Prior Publication Data

US 2015/0006041 A1    Jan. 1, 2015

(51) Int. Cl.
*B60R 22/00*   (2006.01)
*G05D 3/10*    (2006.01)
*B62D 35/00*   (2006.01)
*G05B 19/02*   (2006.01)
*G06F 9/44*    (2006.01)
*B60R 16/023*  (2006.01)

(52) U.S. Cl.
CPC *G05D 3/10* (2013.01); *B62D 35/00* (2013.01); *G05B 19/02* (2013.01); *G06F 9/4443* (2013.01); *B60R 16/0231* (2013.01)

(58) Field of Classification Search
CPC ... B60R 16/0231; B60R 25/24; G06F 9/4443; G07C 9/00944; H01H 2300/04; B60N 2/0248
USPC .................... 701/36, 48, 49; 340/426.34, 438
See application file for complete search history.

(56) References Cited

U.S. PATENT DOCUMENTS

| | | | |
|---|---|---|---|
| 5,291,406 A | 3/1994 | Williams et al. | |
| 5,588,800 A * | 12/1996 | Charles et al. | 416/24 |
| 6,374,171 B2 | 4/2002 | Weiberle et al. | |
| 7,006,901 B2 | 2/2006 | Wang | |
| 8,276,851 B2 | 10/2012 | McKeon | |
| 2003/0065432 A1 * | 4/2003 | Shuman et al. | 701/48 |
| 2003/0152088 A1 * | 8/2003 | Kominami et al. | 370/401 |
| 2004/0158371 A1 * | 8/2004 | Iggulden et al. | 701/29 |
| 2005/0031100 A1 * | 2/2005 | Iggulden et al. | 379/102.03 |
| 2013/0036991 A1 | 2/2013 | Kerns | |

* cited by examiner

*Primary Examiner* — Gertrude Arthur Jeanglaud
(74) *Attorney, Agent, or Firm* — Cantor Colburn LLP

(57) ABSTRACT

A user programmable motor vehicle driving parameter control system includes a motor vehicle including at least one active aerodynamic control element, and a user/vehicle interface member, and a controller including a memory having stored therein a user defined deployment schedule and a processor configured and disposed to selectively deploy the at least one aerodynamic control element based on the user defined deployment schedule.

16 Claims, 3 Drawing Sheets

USER PROGRAMMABLE MOTOR VEHICLE DRIVING PARAMETER CONTROL SYSTEM

FIELD OF THE INVENTION

The subject invention relates to the art of motor vehicles and, more particularly, to a user programmable motor vehicle driving parameter control system.

BACKGROUND

Motor vehicles include aerodynamic body surfaces configured to reduce drag and improve performance. Certain motor vehicles, such as sports cars, include additional aerodynamic surfaces, such as wings, that increase downward force on rear wheels to improve traction. Other aerodynamic surfaces, such as diffuser panels, also increase downward forces to improve fraction. Many performance or racing vehicles include aerodynamic surfaces that may be selectively adjusted to accommodate general conditions on a given day. As conditions change, the aerodynamic surfaces may be re-adjusted. However, the general conditions do not address specific conditions at any given point in time, or location on a race track. Accordingly, it is desirable to provide a user programmable motor vehicle driving parameter control system that enables a driver to pre-program and actively adjust aerodynamic surface configurations for changing driving conditions, and/or to address conditions at different portions of a track and or driver preferences within safe limits of the system.

SUMMARY OF THE INVENTION

In an exemplary embodiment, a user programmable motor vehicle driving parameter control system includes a motor vehicle including at least one active aerodynamic control element, and a user/vehicle interface member and a controller including a memory having stored therein a user defined deployment schedule and a processor configured and disposed to selectively deploy the at least one aerodynamic control element based on the user defined deployment schedule.

In accordance with another exemplary embodiment, a method of programming a motor vehicle control system includes selecting an active aerodynamic control element, establishing a user defined deployment schedule for the active aerodynamic control element, and selectively activating the active aerodynamic control element based on the user defined deployment schedule.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
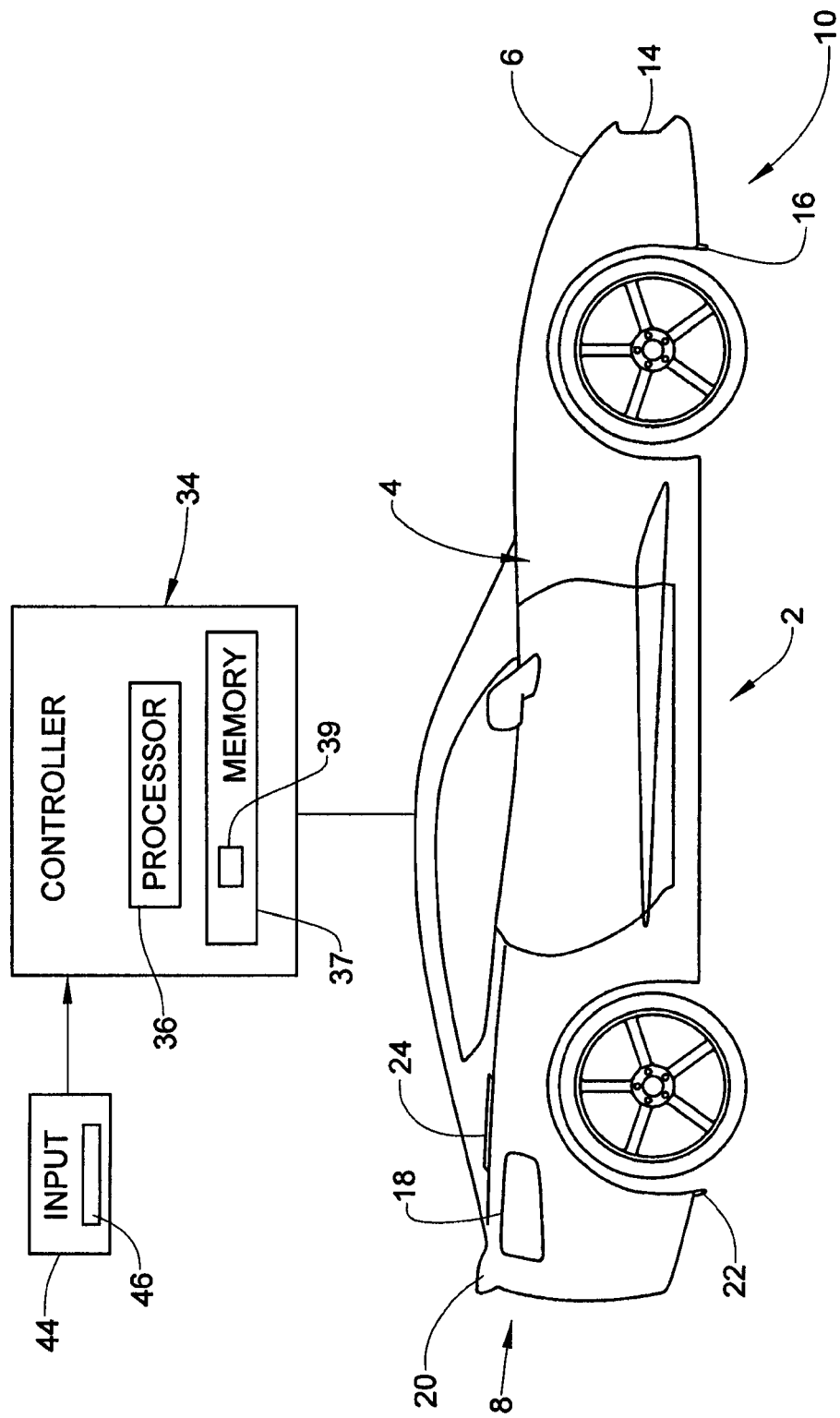
FIG. 1 is a plan view of a motor vehicle including a user programmable motor vehicle driving parameter control system in accordance with an exemplary embodiment.

The following description is merely exemplary in nature and is not intended to limit the present disclosure, its application or uses. It should be understood that throughout the drawings, corresponding reference numerals indicate like or corresponding parts and features. A motor vehicle in accordance with an exemplary embodiment is indicated generally at 2 in FIG. 1. Motor vehicle 2 includes a body 4 having a front end portion 6 and a tail end portion 8. Motor vehicle 2 also includes a plurality of active aerodynamic control elements 10. Active aerodynamic control elements 10 are selectively deployed to adjust driving parameters of motor vehicle 2. In accordance with an aspect of the exemplary embodiment, active aerodynamic control elements 10 may include active brake ducts 14 and an active front diffuser 16 positioned at front end portion 6. Active aerodynamic control elements 10 may also include an active deployable wing 18, an active adjustable spoiler 20 and an active rear diffuser 22 provided at tail end portion 8. Active aerodynamic control elements 10 may further include an active charge air cooler (CAC) shutter 24 positioned forward of active deployable wing 18.

Figure 2:
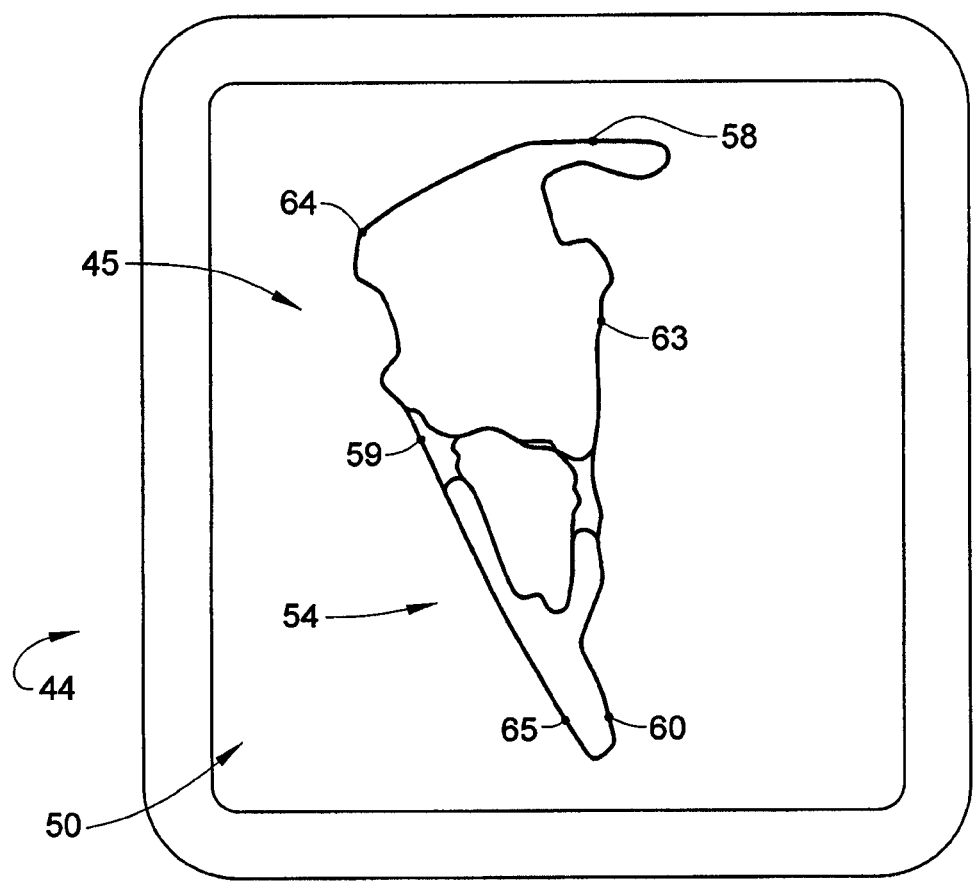
FIG. 2 is a block diagram of a user/vehicle interface of the user programmable motor vehicle driving parameter control system of FIG. 1 in accordance with an aspect of the exemplary embodiment.

In accordance with an exemplary embodiment, motor vehicle 2 includes a controller 34 that is operatively connected to each of the active aerodynamic control elements 10. Controller 34 includes a processor or CPU 36 and a memory 37. Memory 37 stores a user defined deployment schedule 39 that is input into controller 34. More specifically, a user/vehicle interface member 44 is selectively connected to controller 34 to allow a user to select and/or adjust an existing user defined deployment schedule 39 or to establish a new user defined deployment schedule 39. As shown in FIG. 2, user/vehicle interface member 44 includes a display 45 and a module 46.

In accordance with an aspect of the exemplary embodiment, module 46 takes the form of a race track module 50 having stored therein a race track configuration or track layout 54 for a particular racing facility. Race track module 50 enables a user to set activation zones such as shown at 58, 59 and 60 for one or more of active aerodynamic control members 10 and de-activation zones 63, 64, and 65 for the one or more active aerodynamic control members 10. In this manner, a driver or crew can program user defined deployment schedule 39 to adjust driving parameters such as increasing or decreasing downward force on motor vehicle 2 during specific locations of track layout 54. In accordance with one example, a driver, crew chief or the like may add deployment/retraction events by clicking on a portion of the map and selecting a desired active aerodynamic control member event. Accordingly, motor vehicle 2 may adjust active aerodynamic control members 10 for driving conditions on the fly to account for particular features of track layout 54 as opposed to setting up an averaged position for non-active control members that will accommodate an overall track profile.

Figure 3:
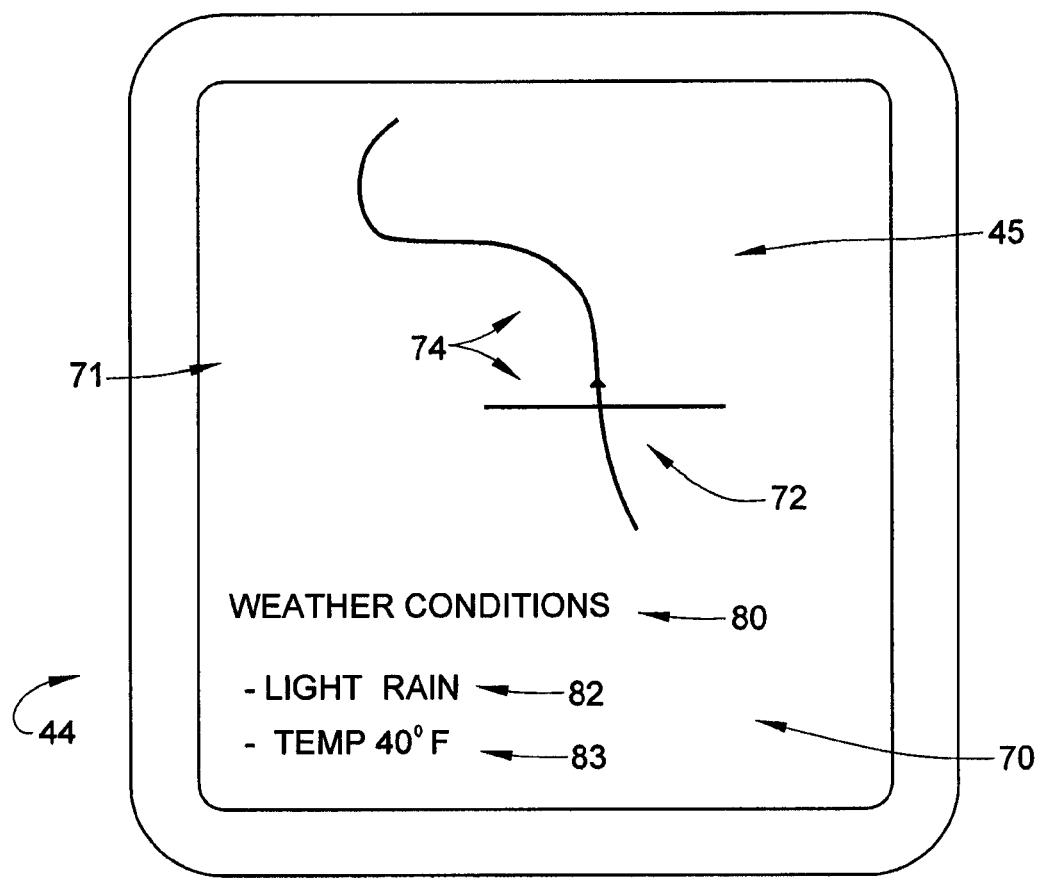
FIG. 3 is a block diagram of a user/vehicle interface of the user programmable motor vehicle driving parameter control system of FIG. 1 in accordance with another aspect of the exemplary embodiment.

In accordance with another aspect of an exemplary embodiment, module 46 may take the form of a driving conditions module 70, such as shown in FIG. 3, wherein like reference numbers represent corresponding parts in the respective views. Driving conditions module 70 includes a GPS section 71 that includes map information 72 that provide road details, such as intersections, curves in the road and the like. Driving conditions module 70 also includes a weather conditions section 80 that enables a user to input current weather conditions such as light rain 82 and temperature 83. The user may establish a user defined deployment schedule that signals controller 34 to activate one or more of active aerodynamic control members 10 based on road conditions and/or approaching route events, such as an intersection or a curve such as shown at 74. For example, a user can select to increase downward force prior to entering a curve, and to decrease downward force when exiting a curve The user may also select to adjust front and rear diffusers 16 and 22 and/or CAC shutter 24 based on current weather conditions to improve driving performance.

At this point it should be understood that the exemplary embodiment provides a system for a user to actively control aerodynamic control members of a motor vehicle. Active control, or adjusting the aerodynamic members while the vehicle is moving, enables users/drivers to enhance vehicle performance characteristics and tailor driving performance for specific track, road, and/or weather conditions. It should also be understood that the user/vehicle interface member may be a vehicle specific control unit or could be a commonly available interface such as a smart phone or smart tablet programmed with an application module.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A user programmable motor vehicle driving parameter control system comprising:
    a motor vehicle including at least one active aerodynamic control element;
    a user/vehicle interface member; and
    a controller including a memory having stored therein a user defined deployment schedule, and a processor configured and disposed to selectively deploy the at least one aerodynamic control element based on the user defined deployment schedule.

2. The user programmable motor vehicle parameter control system according to claim 1, wherein the user/vehicle interface member includes a track module including a race track layout, the processor being configured and disposed to selectively activate the at least one aerodynamic control element at select portions of the track layout.

3. The user programmable motor vehicle parameter control system according to claim 2, wherein the processor is configured and disposed to deactivate the at least one aerodynamic control element at other select portions of the track layout.

4. The user programmable motor vehicle parameter control system according to claim 1, wherein the user/vehicle interface member includes a driving conditions module, the processor being configured and disposed to selectively activate the at least one aerodynamic control element based on current driving conditions.

5. The user programmable motor vehicle parameter control system according to claim 4, wherein the processor is configured and disposed to selectively activate the at least one aerodynamic control element based on current weather conditions.

6. The user programmable motor vehicle parameter control system according to claim 4, wherein the driving conditions module includes a GPS section having map information, the processor being configured and disposed to selectively activate the at least one aerodynamic control element based on an approaching route event detected by the GPS section.

7. The user programmable motor vehicle parameter control system according to claim 1, wherein the at least one aerodynamic control element includes one of an active spoiler, an active wing, an active charge air cooler (CAC) shutter, an active brake duct, an active rear diffuser and an active front diffuser.

8. A method of programming a motor vehicle control system, the method comprising:
    selecting an active aerodynamic control element;
    establishing a user defined deployment schedule for the active aerodynamic control element; and
    selectively activating the active aerodynamic control element based on the user defined deployment schedule.

9. The method of claim 8, further comprising:
    displaying a race track layout on a display; and
    establishing the user defined deployment schedule to activate the active aerodynamic control element at select portions of the race track.

10. The method of claim 9, further comprising: establishing the user defined deployment schedule to de-activate the active aerodynamic control element at other select portions of the race track.

11. The method of claim 10, wherein establishing the user defined deployment schedule to activate the active aerodynamic control element includes one of activating a deployable wing or adjusting an angle of a spoiler prior to entering a curve in the race track.

12. The method of claim 10, wherein establishing the user defined deployment schedule to de-activate the active aerodynamic control element includes one of retracting the deployable wing and adjusting the angle of the spoiler after exiting the curve.

13. The method of claim 8, further comprising: establishing the user defined deployment schedule based on driving conditions.

14. The method of claim 13, wherein establishing the user defined deployment schedule based in driving conditions includes activating the active aerodynamic control element prior to a route change detected by a GPS section.

15. The method of claim 14, wherein activating the active aerodynamic control element prior to a route change includes activating the active aerodynamic control element prior to entering a curve.

16. The method of claim 15, wherein activating the active aerodynamic control element prior to entering the curve includes increasing vehicle downward force.

* * * * *